US012151387B2

(12) United States Patent
Liu

(10) Patent No.: US 12,151,387 B2
(45) Date of Patent: Nov. 26, 2024

(54) TRIGGER KNIFE WITH FIXABLE BLADE POSITION

(71) Applicant: ABLE TREASURE ENTERPRISE LIMITED, Hong Kong (CN)

(72) Inventor: Jia Jie Liu, Guangzhou (CN)

(73) Assignee: ABLE TREASURE ENTERPRISE LIMITED, Hong Kong (CN)

( * ) Notice: Subject to any disclaimer, the term of this patent is extended or adjusted under 35 U.S.C. 154(b) by 222 days.

(21) Appl. No.: 17/566,712

(22) Filed: Dec. 31, 2021

(65) Prior Publication Data

US 2022/0388188 A1 Dec. 8, 2022

(51) Int. Cl.
*B26B 5/00* (2006.01)
*B26B 1/08* (2006.01)

(52) U.S. Cl.
CPC ................ *B26B 5/001* (2013.01); *B26B 1/08* (2013.01); *B26B 5/003* (2013.01)

(58) Field of Classification Search
None
See application file for complete search history.

(56) References Cited

U.S. PATENT DOCUMENTS 10,800,053 B1 * 10/2020 Liu ......................... B26B 5/003
10,994,429 B2 * 5/2021 Wang ...................... B26B 5/001
2008/0250651 A1 * 10/2008 Davis ...................... B26B 5/003 30/162
2021/0178616 A1 * 6/2021 Liu ......................... B26B 5/003
2022/0072722 A1 * 3/2022 Liu ......................... B26B 5/003
2022/0388188 A1 * 12/2022 Liu ......................... B26B 5/001

FOREIGN PATENT DOCUMENTS

CN 113500632 A * 10/2021

OTHER PUBLICATIONS

English translition of Cn 113500632-A, publication date Oct. 15, 2021.*

* cited by examiner

*Primary Examiner* — Hwei-Siu C Payer
(74) *Attorney, Agent, or Firm* — Jeenam Park

(57) ABSTRACT

The present invention discloses a trigger knife with a fixable blade position, including a knife shell, a blade holder, a blade, a first elastic member, a trigger, and a limiting mechanism. The blade holder is capable of moving close to or away from the blade outlet in the inner cavity together with the blade. The trigger is rotatably mounted on the knife shell and configured to drive the blade to extend out of the inner cavity. The first elastic member is configured to drive the blade to be retracted into the inner cavity. The limiting mechanism is configured to limit a rotation angle of the trigger, so that the blade can be fixed to at least one preset position in the inner cavity. In the present invention, the blade can be effectively fixed to the at least one preset position in the inner cavity, which can meet usage requirements.

10 Claims, 8 Drawing Sheets

TRIGGER KNIFE WITH FIXABLE BLADE POSITION

TECHNICAL HELD

The present invention relates to a safety knife, and in particular, to a trigger knife with a fixable blade position.

BACKGROUND

A trigger knife is one of handheld safety knives. A blade of the trigger knife can be retracted into a knife shell, and a trigger enables the blade to extend out of the knife shell during use, thereby improving safety of the trigger knife.

However, in a conventional trigger knife, only the trigger drives and fixes the blade, and it is difficult to effectively fix the blade in a preset position in the knife shell, which cannot meet usage requirements.

SUMMARY

To overcome the shortcomings of the prior art, an objective of the present invention is to provide a trigger knife with a fixable blade position, which can effectively fix a blade to a preset position in a knife shell, to meet usage requirements.

The objective of the present invention is implemented by using the following technical solution:

A trigger knife with fixable blade position, including:

a knife shell, a blade bolder, and a blade, where the knife shell is provided with an inner cavity, the knife shell is provided with a blade outlet communicating with the inner cavity, the blade is disposed on the blade holder, and the blade holder is capable of moving close to or away from the blade outlet in the inner cavity together with the blade;

a trigger, where the trigger is rotatably mounted on the knife shell, so that the trigger is capable of rotating in the inner cavity and is partially exposed outside the knife shell, and the trigger is configured to drive the blade holder and the blade to move close to the blade outlet, so that the blade is capable of extending out of the blade outlet;

a first elastic member, configured to drive the blade holder and the blade to move away from the blade outlet, so that the blade is capable of being retracted into the blade outlet; and a limiting mechanism, configured to limit a rotation angle of the trigger, so that the blade holder is capable of fixing the blade to at least one preset position in the inner cavity.

Further, the limiting mechanism is capable of moving or rotating on the knife shell and matching the trigger.

Further, the trigger knife with a fixable blade position further includes a guide positioning plate, where the guide positioning plate is disposed in the inner cavity, the limiting mechanism is capable of sliding on the guide positioning plate, the guide positioning plate is provided with at least one guide positioning groove, the limiting mechanism is provided with a guide convex block, and the guide convex block is capable of entering the guide positioning groove and snatching the same.

Further, the limiting mechanism includes an adjusting plate and a limiting plate, where the adjusting plate snatches the trigger through the limiting plate, the knife shell is provided with a limiting opening communicating with the inner cavity, the limiting plate is disposed in the inner cavity, the adjusting plate is capable of moving in the limiting opening and driving the limiting plate to move in the inner cavity, at least one fixing part is disposed on the trigger, and the fixing part is capable of matching the limiting plate.

Further, the limiting mechanism further includes a fixed block, the fixed block is disposed on the limiting plate, the fixing part is a step surface provided on the trigger, and the step surface is capable of abutting against the fixed block to limit movement of the fixed block on the step surface.

Further, the trigger knife with a fixable blade position further includes a linkage mechanism and a connecting plate, where the linkage mechanism and the connecting plate are disposed in the inner cavity, the linkage mechanism meshes with and is connected to the trigger and the connecting plate, the connecting plate is connected to the blade holder, and the connecting plate is capable of matching the knife shell, so that the blade holder is capable of fixing the blade to at least one preset position in the inner cavity.

Further, at least one connecting part is disposed on the connecting plate, at least one guide part is disposed on the knife shell, and each connecting part matches one corresponding guide part to enable the blade holder to fix the blade to at least one preset position in the inner cavity.

Further, the linkage mechanism includes a first transmission gear, a second transmission gear, and a first rack, where the first transmission gear and the second transmission gear are rotatably mounted in the inner cavity, the number of teeth of the second transmission gear is greater than or equal to the number of teeth of the first transmission gear, the first rack is connected to the trigger and meshes with the first transmission gear, a second rack is disposed on the connecting plate, and the second rack meshes with and is connected to the second transmission gear.

Further, the trigger knife with a fixable blade position further includes mounting parts for facilitating assembly, where the mounting parts are disposed on the second transmission gear and the second rack respectively, or the mounting parts are disposed on the first transmission gear, the second transmission gear and the second rack respectively; and the mounting parts are capable of corresponding to each other in position.

Further, the trigger knife with a fixable blade position further includes a second elastic member and a blade replacement mechanism, where the blade is detachably mounted on the blade holder, the second elastic member is disposed on the blade holder, the blade is provided with a clamping hole, the second elastic member is capable of running through the clamping hole and capable of matching the blade holder and an inner wall of the knife shell to limit separation of the blade from the inner cavity, and the blade replacement mechanism is configured to drive the elastic member to deform to separate the blade from the inner cavity.

Compared with the prior art, the present invention has the following beneficial effects:

The rotation of a trigger can drive a blade holder and a blade to move close to or away from a blade outlet in an inner cavity, so that the blade is capable of extending out of the blade outlet and being retracted into the blade outlet. A rotation angle of the trigger can be limited under the action of a limiting mechanism, so that the blade can be fixed to at least one preset position in the inner cavity, and an extending-out length of the blade can be effectively controlled, which can meet usage requirements.

Figure 1:
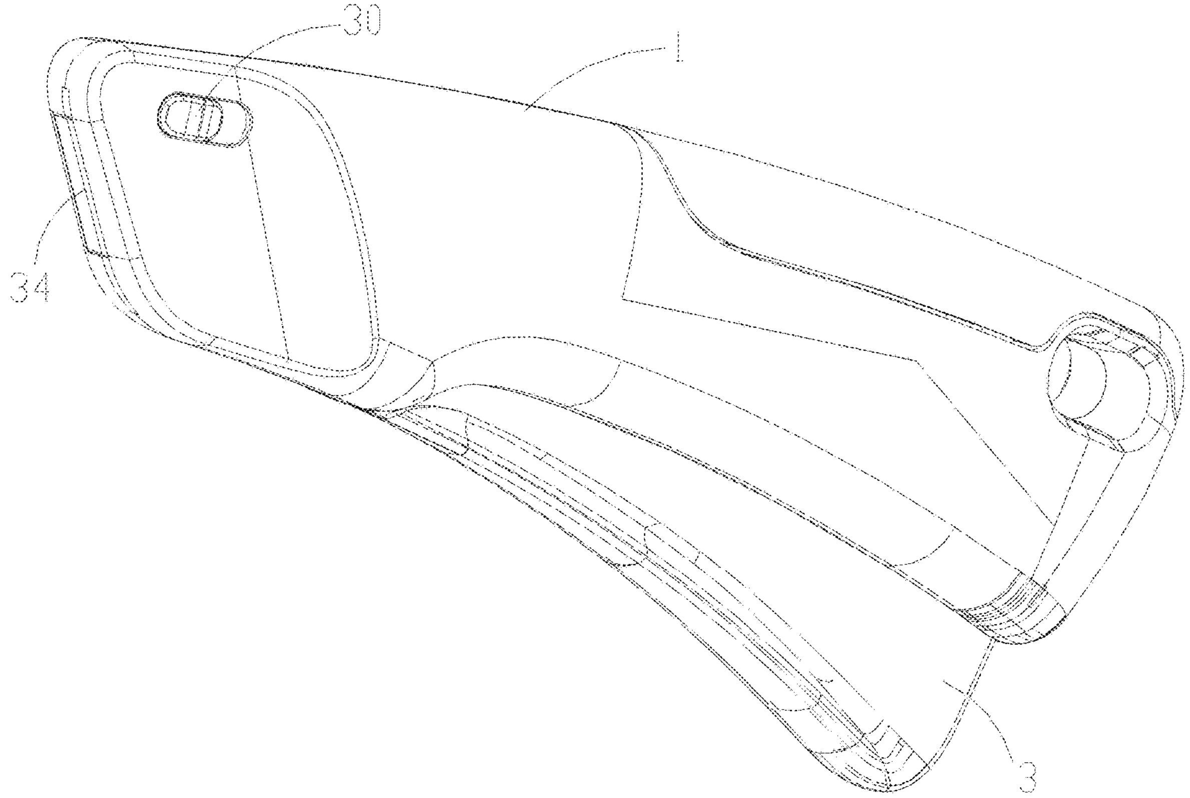
FIG. 1 is a schematic structural diagram of a trigger knife with a fixable blade position according to an embodiment of the present invention viewed from an angle.
Figure 2:
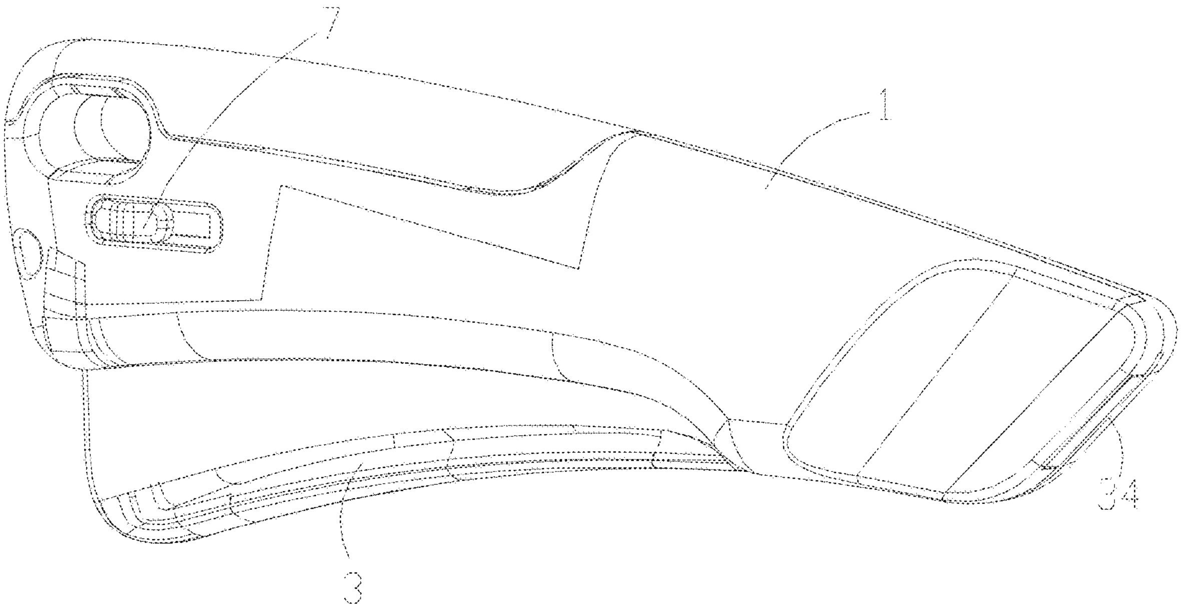
FIG. 2 is a schematic structural diagram of a trigger knife with a fixable blade position according to an embodiment of the present invention viewed from another angle.

In the figures: 1. Knife shell; 2. Blade; 3. Trigger; 4. Guide positioning plate; 5. Second rack; 6. Guide convex block; 7. Adjusting plate; 8. Limiting plate; 9. Connecting plate; 10. First transmission gear; 11. Second transmission gear; 12. First rack; 13. Mounting part; 14. Blade holder; 15. Second elastic member; 16. Clamping hole; 17. First guide positioning groove; 18. Second guide positioning groove; 19. Third guide positioning groove; 20. First fixing part; 21. Second fixing part; Third fixing part; 23. First connecting part; 24. Second connecting part; 25. Third connecting part; 26. First guide part; 27. Second guide part; 28. Third guide part; 29. Guide plate; 30. Blade replacement button; 31. Third elastic member; 32. Blade replacement plate; 33. Fixed block; 34. Blade outlet.

DESCRIPTION OF EMBODIMENTS

The present invention is further described below with reference to the accompanying drawings and specific implementations. It should be noted that, the embodiments or technical features described below can be randomly combined to form new embodiments, provided that no conflict occurs.

As shown in FIG. 1 to FIG. 8, embodiments of the present invention provide a trigger knife with a fixable blade position, including a knife shell 1, a blade holder 14, a blade 2, a first elastic member, a trigger 3, and a limiting mechanism. The knife shell 1 is provided with an inner cavity, the knife shell 1 is provided with a blade outlet 34 communicating with the inner cavity, the blade 2 is disposed on the blade holder 14, and the blade holder 14 is capable of moving close to or away from the blade outlet 34 in the inner cavity together with the blade 2. The trigger 3 is rotatably mounted on the knife shell 1, so that the trigger 3 is capable of rotating in the inner cavity and is partially exposed outside the knife shell 1, and the trigger 3 is configured to drive the blade holder 14 and the blade 2 to move close to the blade outlet 34, so that the blade 2 is capable of extending out of the blade outlet 34. The first elastic member is configured to drive the blade holder 14 and the blade 2 to move away from the blade outlet 34, so that the blade 2 is capable of being retracted into the blade outlet 34. The limiting mechanism is configured to limit a rotation angle of the trigger 3, so that the blade holder 14 is capable of fixing the blade 2 to at least one preset position in the inner cavity.

On the basis of the foregoing structure, the rotation of the trigger 3 can drive the blade holder 14 and the blade 2 to move close to the blade outlet 34 in the inner cavity, so that the blade 2 is capable of extending out of the blade outlet 34. When the trigger 3 is released, the trigger 3 rotates and returns. Under the action of the first elastic member, the blade holder 14 and the blade 2 move in a direction away from the blade outlet 34, so that the blade 2 can belated into the inner cavity, making the trigger knife safe and reliable. The rotation angle of the trigger 3 can be limited under the action of the limiting mechanism, which enables the blade holder 14 to fix the blade 2 to at least one preset position in the inner cavity, and an extending-out length of the blade 2 can be effectively controlled, which can meet usage requirements.

In this embodiment, one end of the trigger 3 is mounted on the knife shell 1 through a rotating shaft, to enable the trigger 3 to rotate in the inner cavity.

During specific implementation, setting one preset position in the inner cavity specifically includes implementations A and B:

In the implementation A, the preset position is a first preset position. After the blade 2 is retracted into the inner cavity, under the action of the limiting mechanism, an angle at which the trigger 3 can rotate is 0, and the blade 2 can be fixed to the first preset position. In this case, the trigger knife is in an locked state, and the blade 2 cannot extend out of the inner cavity, which helps prevent a situation in which the trigger 3 is accidentally touched and the blade 2 is caused to extend out of the inner cavity and is in contact with a user, resulting in injury. The safety performance of the trigger knife is improved.

In the implementation B, the preset position is a second preset position. When the blade 2 needs to extend out of the inner cavity, under the action of the limiting mechanism, the trigger 3 rotates counterclockwise by an angle of a ($a>0$), and the blade 2 can be fixed to the second preset position. In this case, the blade 2 can extend out of the inner cavity, and the length of the blade 2 extending out of the inner cavity is g ($g>0$), so that the trigger knife is in a first-gear push-out state, and the extending-out length of the blade 2 can be effectively controlled to be g, which improves accuracy of extending the blade out and can meet usage requirements.

In other implementations, setting two preset positions in the inner cavity specifically includes implementations C and D:

The implementation C is a combination of the implementations A and B. That is, the two preset positions are a first preset position and a second preset position respectively, and under the action of the limiting mechanism, the blade 2 can be fixed to the first preset position or the second preset position. The trigger knife can be switched between the locked state and the first gear push-out state, which improves the safety performance and accuracy of extending; the blade out.

In the implementation D, the two preset positions are a second preset position and a third preset position respectively. When the blade 2 needs to extend out of the inner cavity, the blade 2 can be fixed to the second preset position or the third preset position under the action of the limiting mechanism. When the trigger 3 rotates counterclockwise by an angle of b ($b>a$), the blade 2 can be fixed to the third preset position. In this case, the blade 2 can extend out of the inner cavity, and the length of the blade 2 extending out of the inner cavity is h ($h>g$), so that the trigger knife is in a second-gear push-out state. In this case, the extending-out length of the blade 2 can be effectively controlled to be g or h, so that the trigger knife can be switched between the first-gear push-out state and the second-gear push-out state, which further improves accuracy of extending the blade out and can meet usage requirements.

During specific implementation, the value range of b may be $7° < b \leq 10°$, and the value range of a may be $4 < a \leq 7°$. In addition, the value range of h may be 15 mm<h≤25 mm, and the value range of g may be 0<g≤15 mm. Preferably, h is 25 mm, and g is 15 mm.

Figure 3:
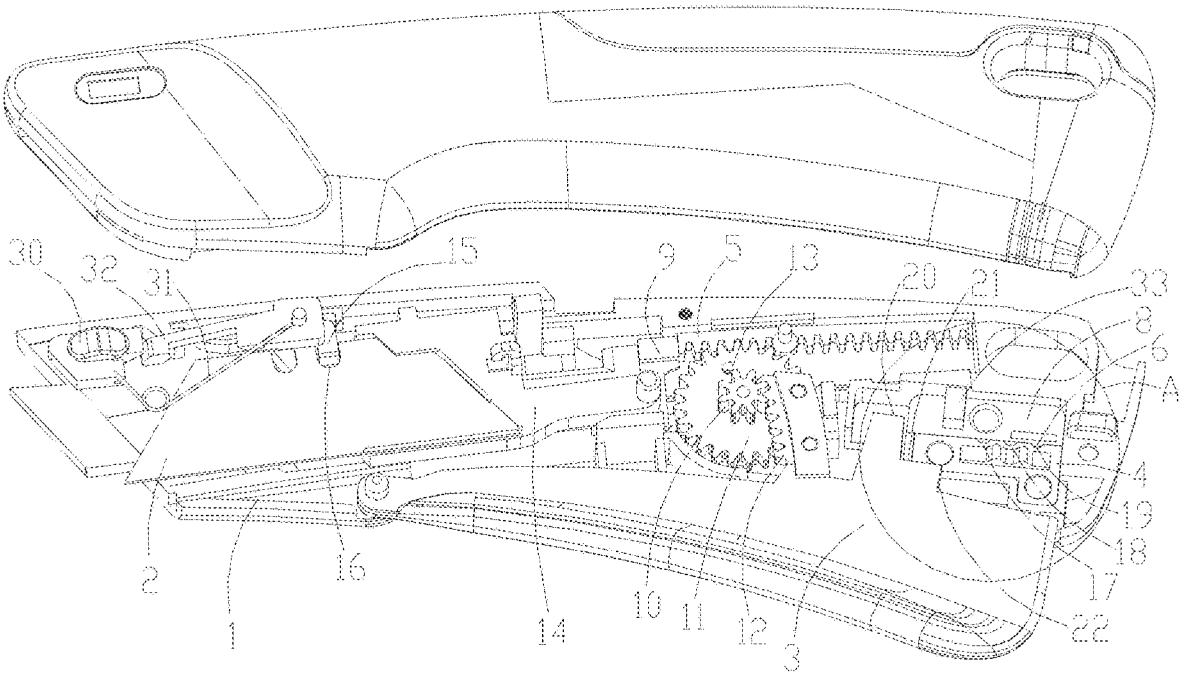
FIG. 3 is a schematic exploded view of the structure in FIG. 1.
Figure 4:
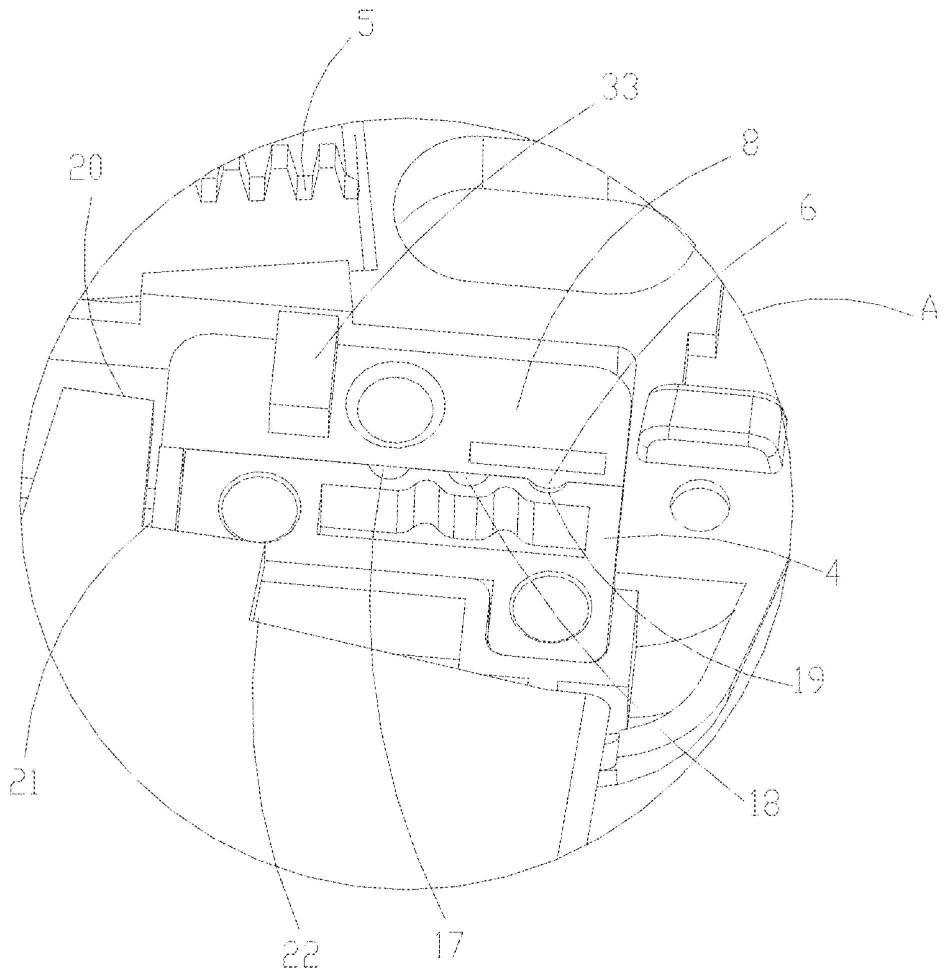
FIG. 4 is a schematic structural diagram of A in FIG. 3.
Figure 5:
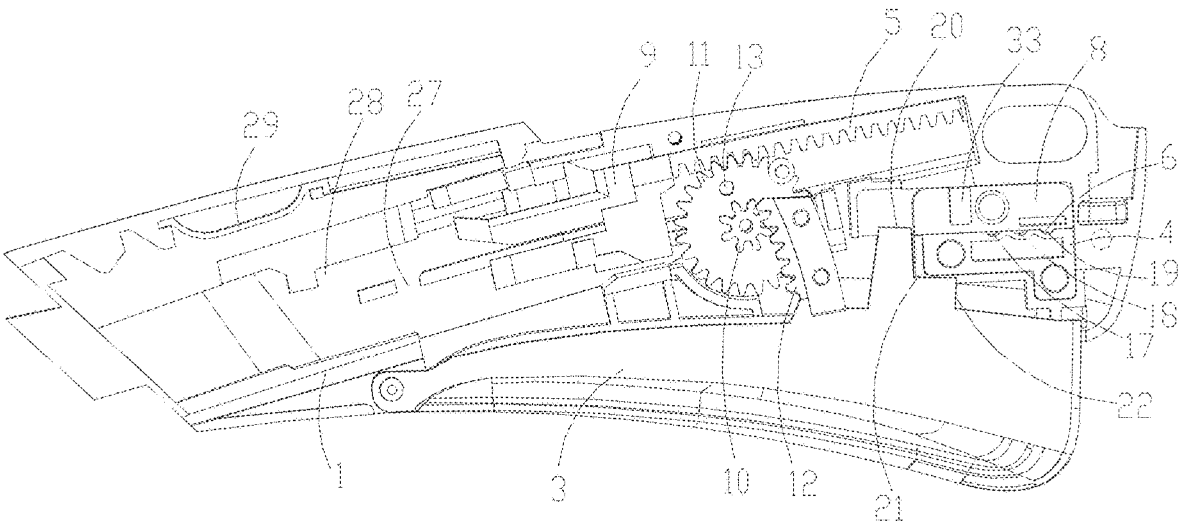
FIG. 5 is a partial schematic diagram of the structure in FIG. 3.
Figure 6:
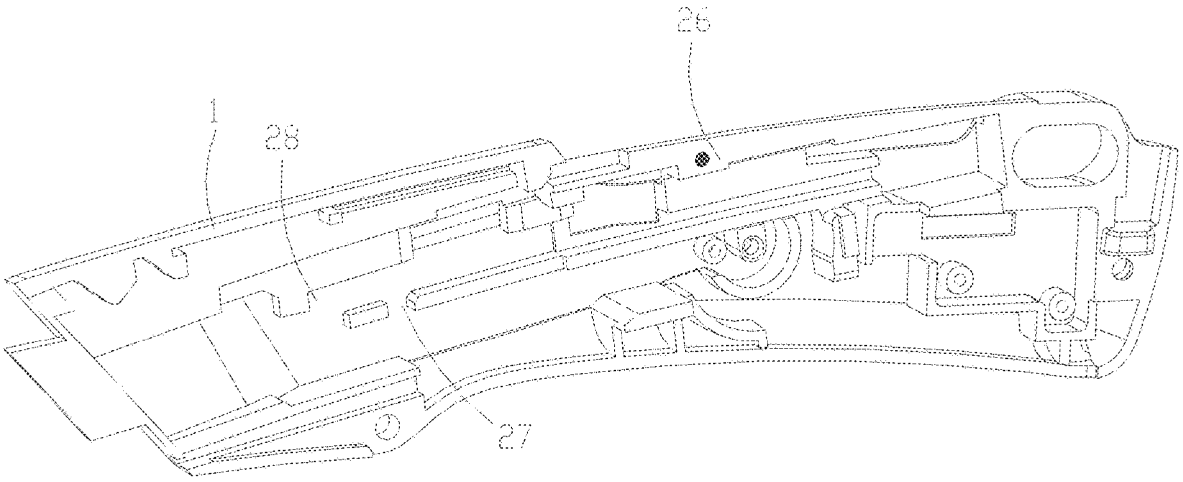
FIG. 6 is a partial schematic diagram of the structure in FIG. 5.
Figure 7:
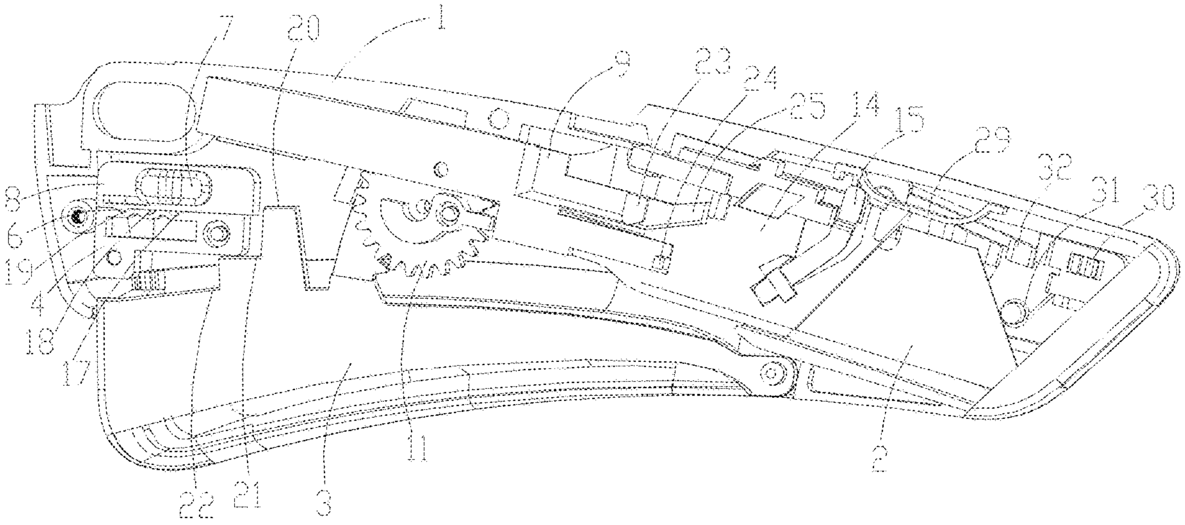
FIG. 7 is a partial schematic structural diagram of the structure in FIG. 2.
Figure 8:
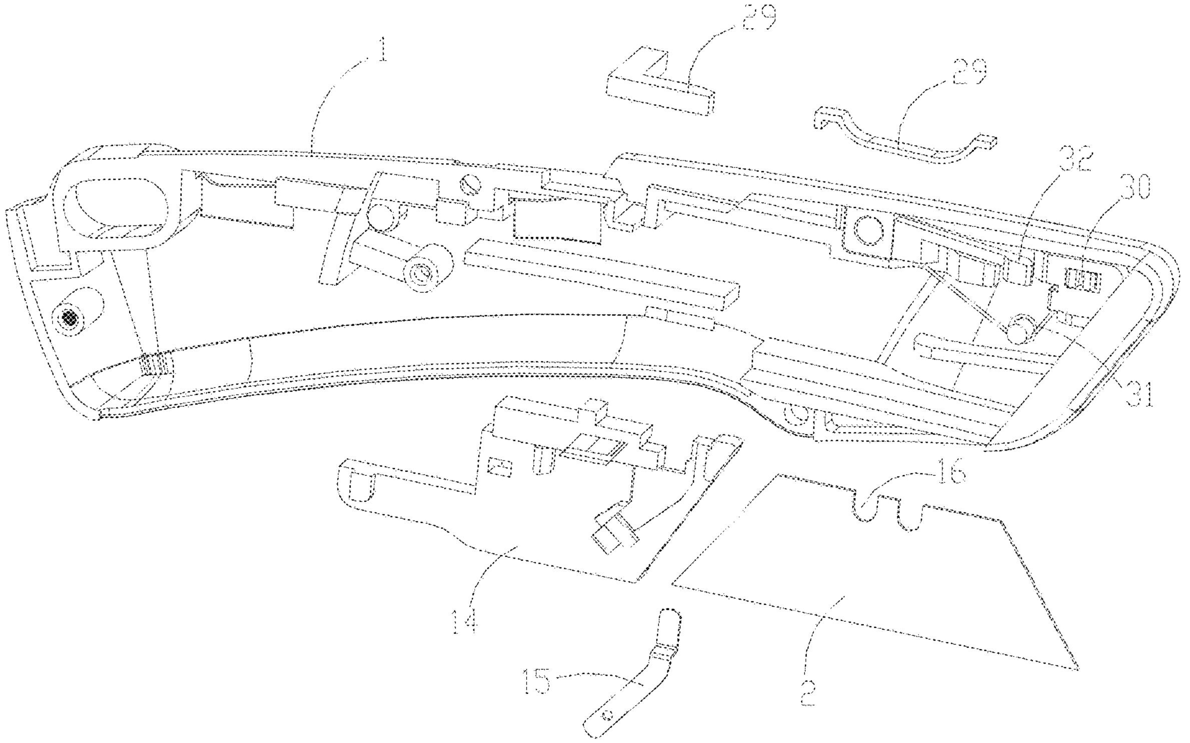
FIG. 8 is a partial schematic exploded view of the structure in FIG. 7.

In this embodiment, as shown in FIG. 3, in an extending-out direction of the blade 2, the blade 2 moves from right to left and extends out of the blade outlet 34. In this embodiment, three preset positions are provided in the inner cavity. That is, a combination of the implementations A and D is used in this embodiment. The three preset positions are provided in the blade extending-out direction, and are a first preset position, a second preset position, and a third preset position in sequence. Based on actual needs, the blade 2 can be fixed to the first preset position, the second preset position, or the third preset position by using the limiting mechanism. In this way, the trigger knife can be switched between the locked state, the first-gear push-out state, and the second-gear push-out state, so that the trigger knife has higher safety performance and accuracy of extending the blade out.

Certainly, more than three preset positions may alternatively be provided in the inner cavity based on actual needs, so that the trigger knife has higher applicability.

In a preferred implementation in this embodiment, the limiting mechanism may move left and right on the knife shell 1 and can match the trigger 3 to limit the rotation angle of the trigger 3.

Certainly, in other embodiments, the limiting mechanism may move up and down on the knife shell 1 and can match the trigger 3, as long as the effect of limiting the rotation of the trigger 3 is achieved.

During specific implementation, the trigger knife further includes a guide positioning plate 4. The guide positioning plate 4 is disposed in the inner cavity, and the limiting mechanism can slide on the guide positioning plate 4. In this way, the guide positioning plate 4 can better guide movement of the limiting mechanism.

In this embodiment, the guide positioning plate 4 is provided with at least one guide positioning groove, the limiting mechanism is provided with a guide convex block 6, and the guide convex block 6 can enter the guide positioning groove and match the same. In this way, through the matching of the guide convex block 6 and the guide positioning groove, a better guiding effect is exerted on the movement of the limiting mechanism, which improves accuracy of the movement of the limiting mechanism.

During specific implementation, the number of the guide positioning grooves is the same as the number of the preset positions, which improves accuracy of the movement of the limiting mechanism, so as to accurately limit the rotation angle of the trigger 3, so that the blade 2 can be fixed to the corresponding preset position in the inner cavity.

In this embodiment, three guide positioning grooves are provided, and the three guide positioning grooves are arranged in a direction in which the blade 2 is retracted, and are a first guide positioning groove 17, a second guide positioning groove 18, and a third guide positioning groove 19 in sequence. The three guide positioning grooves correspond to the first preset position, the second preset position, and the third preset position respectively. Therefore, the guide convex block 6 can match any guide positioning groove, so that the trigger knife can be switched between the locked state, the first-gear push-out state, and the second-gear push-out state, and thus the trigger knife has higher safety performance and accuracy of extending the blade out.

In this embodiment, the guide convex block 6 has an arc-shaped surface, and the guide positioning groove is an arc-shaped groove, so that the arc-shaped surface and the arc-shaped groove can effectively match each other to facilitate smooth movement of the limiting mechanism on the guide positioning plate 4.

During specific implementation, the limiting mechanism includes an adjusting plate 7 and a limiting plate 8, where the adjusting plate 7 matches the trigger 3 through the limiting plate 8, the knife shell 1 is provided with a limiting opening communicating with the inner cavity, the limiting plate 8 is disposed in the inner cavity, the adjusting plate 7 is capable of moving in the limiting opening and driving the limiting plate 8 to move in the inner cavity, at least one fixing part is disposed on the trigger 3, and the fixing part is capable of matching the limiting plate 8. The number of the fixing parts is the same as the number of the preset positions. In this way, when the adjusting plate 7 moves in the limiting opening, the limiting plate 8 can be driven to move in the inner cavity, so that the limiting plate 8 can match the corresponding fixing part on the trigger 3. In this way, the rotation angle of the trigger 3 can be effectively limited, so that the blade 2 can be fixed to the corresponding preset position in the inner cavity.

In this embodiment, three fixing parts are provided, and the three fixing parts are arranged in a direction in which the blade 2 is retracted, and are a first fixing part 20, a second fixing part 21, and a third fixing part 22 in sequence. The three fixing parts correspond to the first guide positioning groove 17, the second guide positioning groove 18, and the third guide positioning groove 19 respectively, that is, the three fixing parts correspond to the first preset position, the second preset position, and the third preset position. Therefore, the limiting plate 8 can match any fixing part, so that the trigger knife can be switched between the locked state, the first-gear push-out state, and the second-gear push-out state, and thus the trigger knife has higher safety performance and accuracy of extending the blade out.

In a preferred implementation, the limiting mechanism further includes a fixed block 33, the fixed block 33 is disposed on the limiting plate 8, each fixing part is a step surface provided on the trigger 3, and the step surface is capable of being in contact with and closely attached to a surface of the fixed block 33 to limit movement) of the fixed block 33 on the step surface. In this way, force applied by the step surface to the fixed block 33 is perpendicular to the step surface, which can prevent component force that causes the fixed block 33 to move on the trigger 3, so as to limit the rotation of the trigger 3 and improve the position fixing effect on the blade 2.

In other embodiments, the fixed block 33 is in point contact with the step surface, so that the step surface and the fixed block 33 abut against each other.

In other embodiments, the limiting mechanism may rotate on the knife shell 1 and can match the trigger 3, to limit the rotation angle of the trigger 3. The limiting mechanism may include a knob. The knife shell 1 is provided with a rotating opening communicating with the inner cavity. The knob is rotatably mounted on the rotating opening and connected to the fixed block 33. The rotation of the knob enables the fixed block 33 to match any fixing part. In this way, the blade 2 can be fixed to the corresponding preset position in the inner cavity.

In this embodiment, the trigger knife further includes a linkage mechanism and a connecting plate 9, where the linkage mechanism and the connecting plate 9 are disposed in the inner cavity, the linkage mechanism meshes with and is connected to the trigger 3 and the connecting plate 9, the connecting plate 9 is connected to the blade holder 14, and the connecting plate 9 is capable of matching the knife shell 1, so that the blade holder 14 is capable of fixing the blade 2 to at least one preset position in the inner cavity. In this way, when the trigger 3 rotates, the linkage mechanism can match the connecting plate 9 to effectively convert the rotational movement of the trigger 3 into linear movement of the blade 2 and drive the blade 2 to move effectively in the inner cavity.

In a preferred implementation, at least one connecting part is disposed on the connecting plate 9, at least one guide part is disposed on the knife shell 1, and each connecting part matches one corresponding guide part to enable the blade holder 14 to fix the blade 2 to at least one preset position in the inner cavity. The other of the connecting plates 9 and the number of the guide parts are the same as the number of the preset positions. In this way, each connecting part matches the corresponding guide part, so that the blade 2 can be fixed to the corresponding preset position, which further improves accuracy of positioning fixing of the blade 2.

In this embodiment, three connecting parts are provided, and the three connecting parts are arranged in a blade extending-out direction, and are a first connecting part 23, a second connecting part 24, and a third connecting part 25 in sequence. Three guide parts are provided, and the three guide parts are arranged in a blade extending-out direction, and are a first guide part 26, a second guide part 27, and a third guide part 28 in sequence. The guide parts are in one-to-one correspondence with the connecting parts, and correspond to the first preset position, the second preset position, and the third preset position respectively. Therefore, each connecting part can match the corresponding fixing part, so that the trigger knife can be switched between the locked state, the first-gear push-out state, and the second-gear push-out state, and thus the trigger knife has higher safety performance and accuracy of extending the blade out. During specific implementation, the linkage mechanisms may include a linkage gear and a first rack 12, where the linkage gear is pivotally connected to the knife shell 1 through a rotating shaft, the first rack 12 is connected to the trigger 3 and meshes with the linkage gear, the connecting plate 9 is provided with a second rack 5, amid the second rack 5 meshes with and is connected to the linkage gear. In this way, the trigger 3 drives the linkage gear to rotate through the first rack 12, and the linkage gear drives the second rack 5 to move in the inner cavity, so that the blade 2 can effectively move in the inner cavity.

In this embodiment, the linkage mechanism is configured to enlarge the stroke, so that the blade 2 can effectively cut a material. The linkage mechanism includes a first transmission gear 10, a second transmission gear 11, a rotating shaft, and a first rack 12. The first transmission gear 10 and the second transmission gear 11 are pivotally connected to the knife shell 1 through the same rotating shaft. The number of teeth of the second transmission gear 11 is greater than the number of teeth of the first transmission gear 10. The first rack 12 is connected to the trigger 3 and meshes with the first transmission gear 10, a second rack 5 is disposed on the connecting plate 9, and the second rack 5 is located on an upper side of the second transmission gear 11 and meshes with and is connected to the second transmission gear 11.

Specifically, the first transmission gear 10 and the second transmission gear 11 may be two independent gears coaxially arranged, or may be formed by integral molding.

In this embodiment, the trigger 3 drives the first transmission gear 10 to rotate through the first rack 12, 8 teeth of the first transmission gear 10 are provided, 24 teeth of the second transmission gear 11 are provided, and the first transmission gear 10 and the second transmission gear 11 are at a transmission ratio of 1:3. Therefore, when the two transmission gears rotate by the same angle, the stroke of the second transmission gear 11 is enlarged by 3 times. When the first transmission gear 10 moves a little bit, that is, the trigger 3 only needs to rotate by a smaller angle, the second transmission gear 11 has gone through a larger stroke, which can drive the second rack 5 to move by a longer stroke. The stroke of the second rack 5 is the extending-out length of the blade 2, so that the blade 2 can extend by a sufficient length to effectively cut the material, and the sensitivity is moderate. A phenomenon that the blade 2 has begun to rebound before cutting does not occur, and the stroke of the trigger rotation is smaller, which saves more time and labor. In the same way, when the blade 2 is not in contact with the material, the first elastic member recovers from deformation. Under the action of the second rack 5, the connecting plate 9 can drive the blade 2 to return to an initial position, so that the blade 2 can be automatically retracted into the inner cavity. This prevents the blade 2 from being in contact with the user and causing injury.

Because the linkage mechanism in this embodiment is a rack and pinion mechanism, rotary motion of the trigger 3 can be converted into linear motion of the blade 2, that is, the motion of the blade 2 is also linear motion, and the blade 2 can move left and right in the inner cavity. This makes it more labor-saving to start under the same stroke of the trigger 3, and therefore it is easier to start the trigger knife. In addition, the number of teeth of the second transmission gear 11 is greater than the number of teeth of the first transmission gear 10. Therefore, the stroke can be enlarged, so that the blade 2 can extend out forward more under the same stroke of the trigger 3. In the prior art, the blade extending-out length of the trigger knife is extremely small (10 mm), and the knife cannot cut off a material with a larger thickness, such as thick cardboard. However, in this embodiment, the stroke can be enlarged under the action of the linkage mechanism, so that the extending-out length of the blade 2 can be up to 25 mm, and a material with a larger thickness can be effectively cut.

During specific implementation, the number of teeth of the first transmission gear 10 may be equal to the number of teeth of the second transmission gear 11, that is, the rotation stroke of the first transmission gear 10 is equal to the rotation stroke of the second transmission gear 11, and the extending-out length of the blade 2 is equal to the rotation stroke of the first transmission gear 10.

In other embodiments, the first transmission gear 10 and the second transmission gear 11 are not coaxially arranged, that is, the first transmission gear 10 and the second transmission gear 11 are mounted in the inner cavity through two rotating shafts respectively. The first transmission gear 10 and the second transmission gear 11 mesh with and are connected to each other, the second rack 5 on the connecting plate 9 is disposed on the lower side of the second transmission gear 11, and the remaining structure is the same as the structure of the linkage mechanism in this embodiment.

In a preferred implementation, the trigger knife further includes mounting parts 13 for facilitating assembly, where the mounting parts 13 are disposed on the second transmission gear 11 and the second rack 5 respectively, or the mounting parts 13 are disposed on the first transmission gear 10, the second transmission gear 11 and the second rack 5 respectively. This enables the foregoing two or three mounting parts 13 to correspond to each other in position, which can ensure that an initial position of the trigger 3 is the same every time, and improves assembly efficiency.

During specific implementation, the mounting parts 13 are each a through hole, which is simple to manufacture, and reduces production and machining costs.

In this embodiment, the mounting parts 13 are each a circular hole and are provided in the second transmission gear 11 and the second rack 5 respectively. During assembly, it can be ensured that the initial position of the trigger 3 is the same every time only by aligning the circular holes in the second transmission gear 11 and the second rack 5 with each other for mounting, so that assembly efficiency is higher.

In other embodiments, the mounting parts 13 may be text or a pattern label or the like.

In addition, the trigger knife further includes a second elastic member 15 and a blade replacement mechanism, where the blade 2 is detachably mounted on the blade holder 14, the second elastic member 15 is disposed on the blade holder 14, the blade 2 is provided with a clamping hole 16, the second elastic member 15 is capable of running through the clamping hole 16 and capable of matching the blade holder 14 and an inner wall of the knife shell 1 to limit separation of the blade 2 from the inner cavity, and the blade replacement mechanism is configured to drive the elastic member 15 to deform to separate the blade 2 from the inner cavity. This can facilitate replacement of the blade 2.

In this embodiment, one end of the first elastic; embers fixed to the inner wall of the knife shell 1, and the other end thereof is fixed to the blade holder 14, so that the blade holder 14 can move and return in the inner cavity, and therefore the blade 2 can be effectively retracted into the inner cavity.

In this embodiment, the first elastic member is a spring, which is simple to manufacture, and reduces production and machining costs.

In other embodiments, the first elastic member may be are elastic band or the like.

In this embodiment, the blade holder 14 can slide in the inner cavity to facilitate the smooth movement of the blade holder 14 in the inner cavity.

In this embodiment, the trigger knife further includes a guide plate 29, and the blade holder 14 is provided with a sliding connecting part. The sliding connecting part matches the guide plate 9 so as to provide a better guiding effect for the movement of the blade holder 14 and enable the blade holder 14 to move smoothly in the inner cavity.

In this embodiment, the blade holder 14 is clamped with the blade 2. The blade holder 14 is provided with a clamping groove for clamping with the blade 2. The clamping groove is provided with a notch communicating with the inner cavity, and the blade 2 can enter or leave the clamping groove through the notch. The second elastic member 15 is disposed on the blade holder 14, and the blade 2 is provided with a clamping hole 16 for the second elastic member 15 to run through. In this way, the blade 2 is mounted in the clamping groove, the second elastic member 15 matches the clamping hole 16, so that the blade 2 is not easily separated from the inner cavity. The blade holder 14 matches the inner wall of the knife shell 1 opposite to the notch, so that the blade 2 is not separated from the clamping groove. In this way, the blade 2 can be effectively mounted on the blade holder 14 and move synchronously with the blade holder 14.

In this embodiment, the second elastic member 15 is an elastic piece, which facilitates the disassembly and assembly of the blade 2.

In other embodiments, the first elastic member 15 may be a torsion spring or the like, as long as the disassembly and assembly of the blade 2 can be implemented.

In this embodiment, the blade replacement mechanism includes a blade replacement button 30, a third elastic member 31, and a blade replacement plate 32. The knife shell 1 is provided with a blade replacement opening communicating with the inner cavity, and the blade replacement button 30 can move in the blade replacement opening. The blade replacement plate 32 is disposed in the inner cavity, and one end thereof is fixed to the inner wall of the knife shell 1. The third elastic member 31 is disposed on the inner wall of the knife shell 1, and two ends of the third elastic member 31 are connected to the blade replacement button 30 and the blade replacement plate 32 respectively.

In this embodiment, the third elastic member 31 is a torsion spring, which is simple in structure, and reduces production and machining costs, in other embodiments, the third elastic member 31 may be a spring, an elastic piece, or the like, as long as the blade replacement button 30 can return.

In other embodiments, the blade replacement mechanism can drive the blade replacement plate 32 to move through a motor, a cylinder, or other driving components, so that the second elastic member 15 is deformed to enable the blade 2 to be separated from the blade holder 14.

When the trigger knife is used, a specific method is as follows:

When the blade 2 needs to be replaced, the blade replacement button 30 can be moved in the blade replacement opening and can match the other end of the blade replacement plate 32, so that the blade replacement plate 32 can abut against the second elastic member 15 and make the second elastic member 15 deformed, so that the second elastic member 15 is separated from the clamping hole 16 to enable the blade 2 to be separated from the clamping groove, and in this case, the blade 2 can be taken out of the inner cavity. The other blade 2 is inserted into the inner cavity and enters the clamping groove. After external force applied to the blade replacement button 30 disappears, the third elastic member 31 recovers from deformation, and then the blade replacement button 30 returns, so that the blade replacement plate 32 and the second elastic member 15 return, and the second elastic member 15 re-enters the clamping opening and matches the clamping opening. In this way, the replacement of the blade 2 is completed.

When the trigger knife needs to be locked, the adjusting plate 7 is moved in the blade extending-out direction in the limiting opening, and the adjusting plate 7 drives the limiting plate 8 to move in the inner cavity, so that the guide convex block 6 enters the first guide positioning groove 17, in this case, the fixed block 33 can match the first fixing part 20, so that the trigger 3 cannot be rotated, and the first guide part 26 matches the first connecting part 23, and therefore the blade holder 14 cannot move in the inner cavity. Therefore, the blade 2 is fixed to the first preset position, the trigger knife is in the locked state, and the blade 2 cannot extend out of the inner cavity.

When the blade 2 needs to be pushed out to the second preset position, the adjusting plate 7 is caused to move in the knife extending-out direction in the limiting opening, and the adjusting plate 7 drives the limiting plate 8 to move in the inner cavity, so that the guide convex block 6 enters the second guide positioning groove 18, and the trigger 3 rotates by an angle $\alpha$. In this case, the fixed block 33 matches the second fixing part 21, so that the trigger 3 cannot continue to rotate. When the trigger 3 rotates, the blade holder 14 is driven to move in the inner cavity, causing the second guide part 27 to match the second connecting part 24, so that the blade holder 14 cannot move in the inner cavity, thereby fixing the blade 2 to the second preset position. In this case, the length of the blade 2 extending out of the inner cavity is g, and the trigger knife is in the first-gear push-out state.

When the blade 2 needs to be pushed out to the third preset position, the adjusting plate 7 is caused to move in the knife extending-out direction in the limiting opening, and the adjusting plate 7 drives the limiting plate 8 to move in the inner cavity, so that the guide convex block 6 enters the third guide positioning groove 19, and the trigger 3 rotates by an angle h. In this case, the fixed block 33 matches the third fixing part 22, so that the trigger 3 cannot continue to rotate. When the trigger 3 rotates, the blade holder 14 is driven to move in the inner cavity, causing the third guide part 28 to match the third connecting part 25, so that the blade holder 14 cannot move in the inner cavity, thereby fixing the blade 2 to the third preset position. In this case, the length of the blade 2 extending out of the inner cavity is h, and the trigger knife is in the second-gear push-out state.

The foregoing implementations are only preferred implementations of the present invention, and cannot be used to limit the protection scope of the present invention. Any non-substantial changes and replacements made by a person skilled in the art on the basis of the present invention fall within the protection scope claimed by the present invention.

What is claimed is:

1. A trigger knife with a fixable blade position, comprising:

a knife shell (1), a blade holder (14), and a blade (2), wherein the knife shell (1) is provided with an inner cavity, the knife shell (1) is provided with a blade outlet (34) communicating with the inner cavity, the blade (2) is disposed on the blade holder (14), and the blade holder (14) is capable of moving close to or away from the blade outlet (34) in the inner cavity together with the blade (2);

a trigger (3), wherein the trigger (3) is rotatably mounted on the knife shell (1), so that the trigger (3) is capable of rotating in the inner cavity and is partially exposed outside the knife shell (1), and the trigger (3) is configured to drive the blade holder (14) and the blade (2) to move close to the blade outlet (34), so that the blade (2) is capable of extending out of the blade outlet (34);

a first elastic member, configured to drive the blade holder (14) and the blade (2) to move away from the blade outlet (34), so that the blade (2) is capable of being retracted into the blade outlet (34); and a limiting mechanism, configured to limit a rotation angle of the trigger (3), so that the blade holder (14) is capable of fixing the blade (2) to at least one preset position in the inner cavity.

2. The trigger knife with a fixable blade position according to claim 1, wherein the limiting mechanism is capable of moving or rotating on the knife shell (1); when the trigger (3) drives the blade holder (14) and the blade (2) to move toward the blade outlet (34), the limiting mechanism moves away from the blade outlet (34); when the trigger (3) drives the blade holder (14) and the blade (2) to move away from the blade outlet (34), the rotation angle of the trigger (3) is limited to enable the blade (2) being limited to at least one preset position in the inner cavity.

3. The trigger knife with a fixable blade position according to claim 2, further comprising a guide positioning plate (4), wherein the guide positioning plate (4) is disposed in the inner cavity, the limiting mechanism is capable of sliding on the guide positioning plate (4), the guide positioning plate (4) is provided with at least one guide positioning groove, the limiting mechanism is provided with a guide convex block (6), and the guide convex block (6) is capable of entering the guide positioning groove and matching the same.

4. The trigger knife with a fixable blade position according to claim 2, wherein the limiting mechanism comprises an adjusting plate (7) and a limiting plate (8), the knife shell (1) is provided with a limiting opening communicating with the inner cavity, the limiting plate (8) is disposed in the inner cavity, the adjusting plate (7) is capable of moving in the limiting opening and driving the limiting plate (8) to move in the inner cavity, at least one fixing part is disposed on the trigger (3), the limiting plate (8) is capable of abutting against the at least one fixing part to limit the rotation angle of the trigger (3).

5. The trigger knife with a fixable blade position according to claim 4, wherein the limiting mechanism further comprises a fixed block (33), the fixed block (33) is disposed on the limiting plate (8), the fixing part is a step surface provided on the trigger (3), and the step surface is capable of abutting against the fixed block (33) to limit movement of the fixed block (33) on the step surface.

6. The trigger knife with a fixable blade position according to claim 1, further comprising a linkage mechanism and a connecting plate (9), wherein the linkage mechanism and the connecting plate (9) are disposed in the inner cavity, the linkage mechanism meshes with and is connected to the trigger (3) and the connecting plate (9), the connecting plate (9) is connected to the blade holder (14).

7. The trigger knife with a fixable blade position according to claim 6, wherein at least one connecting part is disposed on the connecting plate (9), at least one guide part is disposed on the knife shell (1), and each connecting part matches one corresponding guide part to enable the blade holder (14) to fix the blade (2) to at least one preset position in the inner cavity.

8. The trigger knife with a fixable blade position according to claim 6, wherein the linkage mechanism comprises a first transmission gear (10), a second transmission gear (11), and a first rack (12), the first transmission gear (10) and the second transmission gear (11) are rotatably mounted in the inner cavity, the number of teeth of the second transmission gear (11) is greater than or equal to the number of teeth of the first transmission gear (10), the first rack (12) is connected to the trigger (3) and meshes with the first transmission gear (10), a second rack (5) is disposed on the connecting plate (9), and the second rack (5) meshes with and is connected to the second transmission gear (11).

9. The trigger knife with a fixable blade position according to claim 8, further comprising mounting parts (13) for facilitating assembly, wherein the mounting parts (13) are disposed on the second transmission gear (11) and the second rack (5) respectively, or the mounting parts (13) are disposed on the first transmission gear (10), the second transmission gear (11) and the second rack (5) respectively; and the mounting parts (13) are capable of corresponding to each other in position.

10. The trigger knife with a fixable blade position according to claim 1, further comprising a second elastic member (15) and a blade replacement mechanism, wherein the blade (2) is detachably mounted on the blade holder (14), the second elastic member (15) is disposed on the blade holder (14), the blade (2) is provided with a clamping hole (16), a first end of the second elastic member (15) is connected to the blade holder (14); a second end of the second elastic member (15) is clamped in the clamping hole (16); when the blade holder (14) moves and drives the blade (2) to move, the second elastic member limited the blade (2) from separating from the inner cavity; and the blade replacement mechanism is configured to drive the second elastic member (15) to deform to separate the blade (2) from the inner cavity.

* * * * *